United States Patent
Hirao et al.

(10) Patent No.: US 8,838,336 B2
(45) Date of Patent: Sep. 16, 2014

(54) VEHICLE BODY ATTITUDE CONTROL APPARATUS

(75) Inventors: Ryusuke Hirao, Kamagaya (JP); Makoto Yamakado, Tsuchiura (JP); Nobuyuki Ichimaru, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/190,726

(22) Filed: Jul. 26, 2011

(65) Prior Publication Data

US 2012/0029770 A1   Feb. 2, 2012

(30) Foreign Application Priority Data

Jul. 29, 2010   (JP) ................................. 2010-170247

(51) Int. Cl.
*B60G 17/08*   (2006.01)

(52) U.S. Cl.
CPC ........ *B60G 17/08* (2013.01); *B60G 2400/0511* (2013.01); *B60G 2400/0522* (2013.01); *B60G 2400/0521* (2013.01); *B60G 2400/204* (2013.01); *B60G 2500/10* (2013.01); *B60G 2400/41* (2013.01)
USPC ............................. 701/38; 701/31.4; 303/146

(58) Field of Classification Search
CPC .. B60G 17/08; B60G 17/018; B60G 17/0162; B60G 7/008; B60G 21/051; B60G 17/0182; B60G 17/06; B60G 17/0165; B60G 17/0152; B60W 40/105
USPC ...................... 701/4, 11, 13, 31.4, 37, 38, 70; 280/5.507, 5.508; 188/266.1; 244/3.22, 244/4 A, 166, 169; 303/146
See application file for complete search history.

(56) References Cited

U.S. PATENT DOCUMENTS 3,937,423 A * 2/1976 Johansen ..................... 244/3.22
3,984,072 A * 10/1976 von Pragenau et al. ...... 244/169

(Continued)

FOREIGN PATENT DOCUMENTS

JP   2007-170590   7/2007
JP   2007-290650   11/2007

OTHER PUBLICATIONS

Hideki Sakai et al., "*Improvement of Roll Feeling Based on Visual Sensitivity*", published in Toyota Technical Review, vol. 55. No. 1 (Nov. 2006) pp. 20-24.

(Continued)

*Primary Examiner* — Tuan C. To
*Assistant Examiner* — Yuri Kan
(74) *Attorney, Agent, or Firm* — Wenderoth, Lind & Ponack, LLP

(57) ABSTRACT

A vehicle body attitude control apparatus capable improving cornering operability, steering stability, and ride comfort while a vehicle is running. A controller includes a gain, a determination unit, a multiplication unit, an FF control unit, a difference calculation unit, an FB control unit, an average value calculation unit, a target damping force calculation unit, and a damper instruction value calculation unit so as to enable such control that a pitch rate and a roll rate are set into a proportional relationship while the vehicle is cornering. The controller calculates a target pitch rate proportional to the roll rate, variably controls a damping force characteristic of a damping force variable damper disposed at each the wheels so as to achieve the target pitch rate, and generates a pitch moment to be applied to the vehicle body.

15 Claims, 11 Drawing Sheets

(56) References Cited

U.S. PATENT DOCUMENTS

| | | | |
|---|---|---|---|
| 5,231,583 A * | 7/1993 | Lizell | 701/37 |
| 5,497,324 A * | 3/1996 | Henry et al. | 701/37 |
| 5,638,275 A * | 6/1997 | Sasaki et al. | 701/38 |
| 6,113,034 A * | 9/2000 | Basuthakur et al. | 244/166 |
| 8,285,449 B2 * | 10/2012 | Iyoda et al. | 701/38 |
| 2002/0113165 A1 * | 8/2002 | Moshier | 244/4 A |
| 2003/0236603 A1 * | 12/2003 | Lu | 701/37 |
| 2004/0178587 A1 * | 9/2004 | Hiebert et al. | 280/5.507 |
| 2005/0165517 A1 * | 7/2005 | Reich | 701/11 |
| 2007/0039790 A1 * | 2/2007 | Timoney et al. | 188/266.1 |
| 2007/0129861 A1 * | 6/2007 | Hashiba et al. | 701/29 |
| 2008/0262690 A1 * | 10/2008 | Hidaka et al. | 701/70 |
| 2009/0108671 A1 * | 4/2009 | Maeda et al. | 303/146 |
| 2009/0140501 A1 * | 6/2009 | Taylor et al. | 280/5.508 |
| 2010/0191420 A1 * | 7/2010 | Honma et al. | 701/38 |
| 2010/0198448 A1 * | 8/2010 | Ono et al. | 701/29 |
| 2011/0010027 A1 * | 1/2011 | Patera | 701/13 |
| 2011/0029198 A1 * | 2/2011 | Mizuta et al. | 701/38 |
| 2011/0082604 A1 * | 4/2011 | Lam | 701/4 |
| 2011/0172854 A1 * | 7/2011 | Barker | 701/4 |
| 2012/0029770 A1 * | 2/2012 | Hirao et al. | 701/38 |

OTHER PUBLICATIONS

Kenji Kawagoe, "*A Study of Vehicle Roll Behavior (Japanese Title: Suspension Technology for Improvement of Roll Feeling)*", published in Journal of Society of Automotive Engineers of Japan (Japanese Title: Automotive Technology), vol. 51, No. 11 (1997) pp. 20-24.

Hitoshi Fukuba et al., "*Vehicle Attitude Measurement Method with GPS*", published in Matsuda Technical Review, No. 20 (2002) pp. 130-138.

\* cited by examiner

VEHICLE BODY ATTITUDE CONTROL APPARATUS

BACKGROUND OF THE INVENTION

1. Technical Field

The present invention relates to a vehicle body attitude control apparatus for use in, preferably, a vehicle such as a four-wheeled automobile.

2. Description of the Related Art

Generally, there is known a vehicle body attitude control apparatus configured to reduce a roll rate by calculating lateral acceleration from a steering angle and a vehicle speed of the vehicle, obtaining lateral jerk by differentiating the lateral acceleration, and switching damping forces of the respective suspensions of the front, rear, left, and right wheels according to the lateral jerk (for example, refer to Japanese Patent Application Public Disclosure No. 2007-290650).

Further, there is also known an apparatus capable of achieving a target behavior of a vehicle body to stabilize the attitude of the vehicle body by obtaining a target roll angle from lateral acceleration while the vehicle is running, calculating a target pitch angle according to the target roll angle, and performing feedback control (FB control) by obtaining a difference between an actual roll angle and an actual pitch angle (for example, refer to Japanese Patent Application Public Disclosure No. 2007-170590).

On the other hand, a driver's feeling during a steering operation of a vehicle has been studied by various researches until now, as indicated in, for example, non-patent documents 1, 2, and 3 listed in "LIST OF NON-PATENT DOCUMENTS" which will be provided below. The non-patent document 1 focuses on the relationship between a roll angle and a pitch angle while the vehicle is running, and discusses that reducing a phase difference between a roll angle and a pitch angle can improve a driver's feeling such as a ride comfort and steering stability that the driver feels on the vehicle. The non-patent document 2 discusses that a driver can have a good feeling toward a roll behavior accompanied by head-down pitching when the driver operates the steering wheel. Further, the non-patent document 3 discusses that a driver can have a good feeling if the rotational axis hardly wobbles with a roll behavior and a pitch behavior of the vehicle in harmony with each other.

The contents of these non-patent documents 1 to 3 can be generally divided into two points as indicated by the following items (1) and (2).

(1) A phase difference between a roll angle and a pitch angle is small.
A phase difference between a roll rate and a pitch rate is small. The roll rate and the pitch rate are in a proportional relationship.
The rotational axis of a roll motion and a pitch motion is stabilized, and especially, the non-patent documents 1 and 3 indicate that the rotational axis of rolling and pitching hardly wobbles.

(2) The non-patent document 2 indicates a roll behavior accompanied by head-down pitching.

LIST OF NON-PATENT DOCUMENTS

[Non-patent Document 1]
"Improvement of Roll Feeling Based on Visual Sensitivity" written by Hideki Sakai and 5 others, published in TOYOTA Technical Review Vol. 55 No. 1 (November, 2006) pages 20 to 24.

[Non-patent Document 2]
"A Study of Vehicle Roll Behavior (Suspension Technology for Improvement of Roll Feeling)" written by Kenji Kawagoe, published in Journal of Society of Automotive Engineers of Japan (Automotive Technology) Vol. 51 No. 11 (1997) pages 20 to 24

[Non-patent Document 3]
"Vehicle Attitude Measurement Method with GPS" written by Hitoshi Fukuba and 2 others, published in Matsuda Technical Review No. 20 (2002) pages 130 to 138.

However, the related technology discussed in the above-mentioned Japanese Patent Application Public Disclosure No. 2007-290650 is a logic only addressing a reduction in a roll rate, and therefore may be unable to solve a bad feeling during transitional cornering when a roll rate and a pitch rate are not highly related or an unintended pitch rate is generated.

In addition, the other related technologies also have a problem; even during normal cornering, they should control the attitude of a vehicle to generate a pitch angle according to a roll angle when the vehicle is running. However, control of damping force variable dampers may result in a compromise of a ride comfort, while control of the brake cannot avoid excessive slowdown of the vehicle.

SUMMARY OF THE INVENTION

One object of the present invention is to provide a vehicle body attitude control apparatus capable of improvement of cornering operability, steering stability, and a ride comfort while a vehicle is running.

To achieve the above-mentioned and other objects, the present invention is a vehicle body attitude control apparatus for controlling an attitude of a vehicle body of a vehicle. The vehicle body attitude control apparatus includes a target pitch rate calculation unit configured to calculate a target pitch rate as a target value of a pitch rate of the vehicle body so that the pitch rate is increased according to an degree of a roll rate of the vehicle body, and a pitch moment generation unit configured to generate a pith moment to be applied to the vehicle body so that the pitch rate of the vehicle body approaches the target pitch rate.

DETAILED DESCRIPTION OF THE PREFERRED EMBODIMENTS

Figure 1:
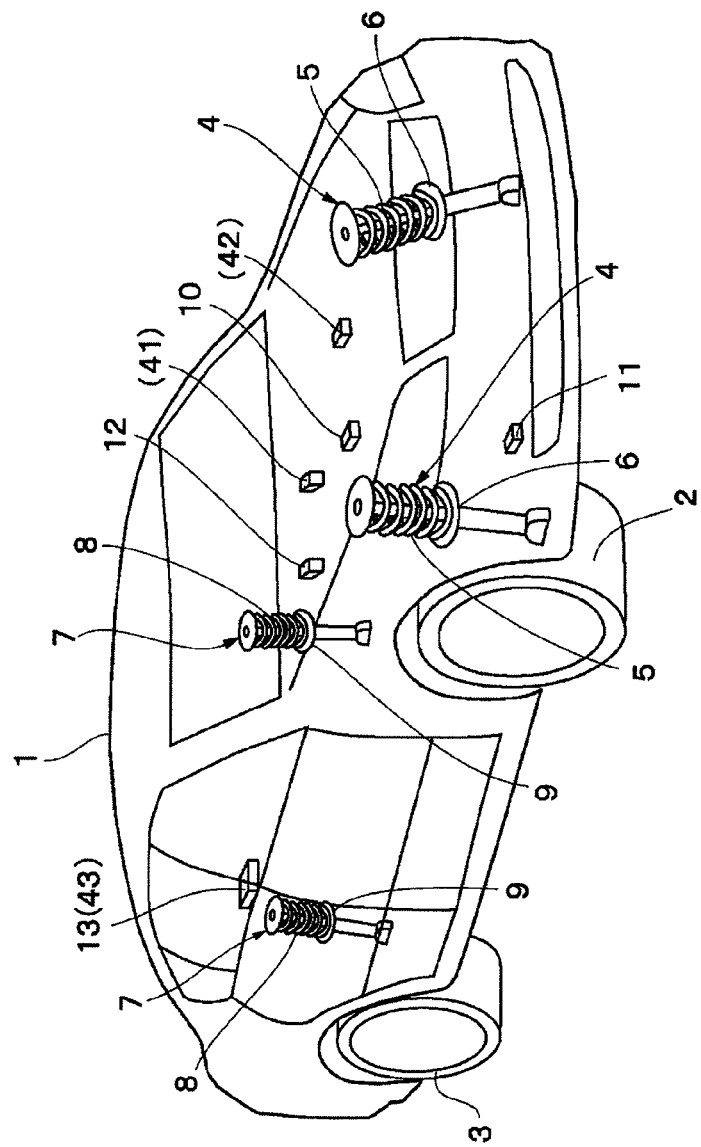
FIG. 1 is a perspective view illustrating a four-wheeled automobile to which a vehicle body attitude control apparatus according to a first embodiment or a second embodiment of the present invention is applied.

In the following, a vehicle body attitude control apparatus according to embodiments of the present invention will be described in detail with reference to the accompanying drawings, based on an example of this apparatus applied to, for example, a four-wheeled vehicle.

FIGS. 1 to 10 illustrate a first embodiment of the present invention. In the drawings, reference numeral 1 denotes a vehicle body constituting a vehicle main structure. The vehicle body is provided with, for example, front left and right wheels 2 (only one of them shown) and rear left and right wheels 3 (only one of them shown) disposed at the lower side of the vehicle body.

Reference numeral 4 denotes front-wheel-side suspension apparatuses disposed between the front left and right wheels 2 and the vehicle body 1. The front-wheel-side suspension apparatuses 4 each include a left or right suspension spring 5 (hereinafter referred to as "spring 5"), and a left or right damping force adjustable shock absorber 6 (hereinafter referred to as "damping force variable damper 6") disposed between the front left or right wheel 2 and the vehicle body 1 in parallel with the left or right spring 5. The damping force variable damper 6 constitutes a part of a pitch moment generation unit, which is a constituent element of the present invention.

Reference numeral 7 denotes rear-wheel-side suspension apparatuses disposed between the rear left and right wheels 3 and the vehicle body 1. The rear-wheel-side suspension apparatuses 7 each include a left or right suspension spring 8 (hereinafter referred to as "spring 8"), and a left or right damping force adjustable shock absorber 9 (hereinafter referred to as "damping force variable damper 9") disposed between the rear left or right wheel 3 and the vehicle body 1 in parallel with the left or right spring 8. The damping force variable damper 9 constitutes a part of the pitch moment generation unit.

The damping force variable dampers 6 and 9 of the respective suspension apparatuses 4 and 7 are each constituted with use of a hydraulic shock absorber capable of adjusting its damping force. The damping force variable dampers 6 and 9 are each attached to an actuator (not shown), which is constituted by, for example, a damping force adjustment valve and solenoid, to continuously adjust its damping force characteristic from the hard characteristic (hardness) to the soft characteristic (softness). However, the actuator for adjusting the damping force may be not to be configured to continuously change the damping force characteristic, but may be configured to change the damping force characteristic in a stepwise manner including 2 or 3 steps or more. Further, the damping force variable dampers 6 and 9 may be embodied by any damper capable of switching the damping force such as a pneumatic damper or an electromagnetic damper.

Reference numeral 10 denotes a roll rate sensor constituted by, for example, a gyroscope as a roll state detection unit (roll rate detection unit) disposed on the vehicle body 1. The roll rate sensor 10 detects a lateral vibration from side to side which may be generated, for example, when the vehicle is running while cornering according to a steering operation of the vehicle, and outputs the detection signal to a controller 13 which will be described later. The roll rate detection unit may be embodied by any sensor capable of detecting a roll rate by, for example, integrating a difference between two vertical acceleration sensors disposed in a relationship spaced-apart in the lateral direction.

Reference numeral 11 denotes a pitch rate sensor constituted by, for example, a gyroscope as a pitch state detection unit (pitch rate detection unit) disposed on the vehicle body 1. The pitch rate sensor 11 detects a vibration in the longitudinal direction which may be generated, for example, during acceleration or deceleration of the vehicle, and outputs the detection signal to the controller 13 which will be described later. A single three-dimensional gyroscope may serve as both the above-mentioned roll rate sensor 10 and this pitch rate sensor 11. Further, the pitch rate detection unit may be embodied by any sensor capable of detecting a pitch rate by, for example, integrating a difference between two vertical acceleration sensors disposed in a relationship spaced-apart in the longitudinal direction. Alternatively, a pitch rate (estimated value) may be obtained by estimating a braking force due to a driver's operation or an automatic braking system, and an acceleration value by an operation of an accelerator.

Reference numeral 12 denotes a lateral acceleration sensor disposed at the vehicle body 1. The lateral acceleration sensor 12 detects lateral acceleration which may be generated in the lateral direction of the vehicle, for example, while the vehicle is running while cornering, and outputs the detection signal to the controller 13 which will be described later.

Figure 2:
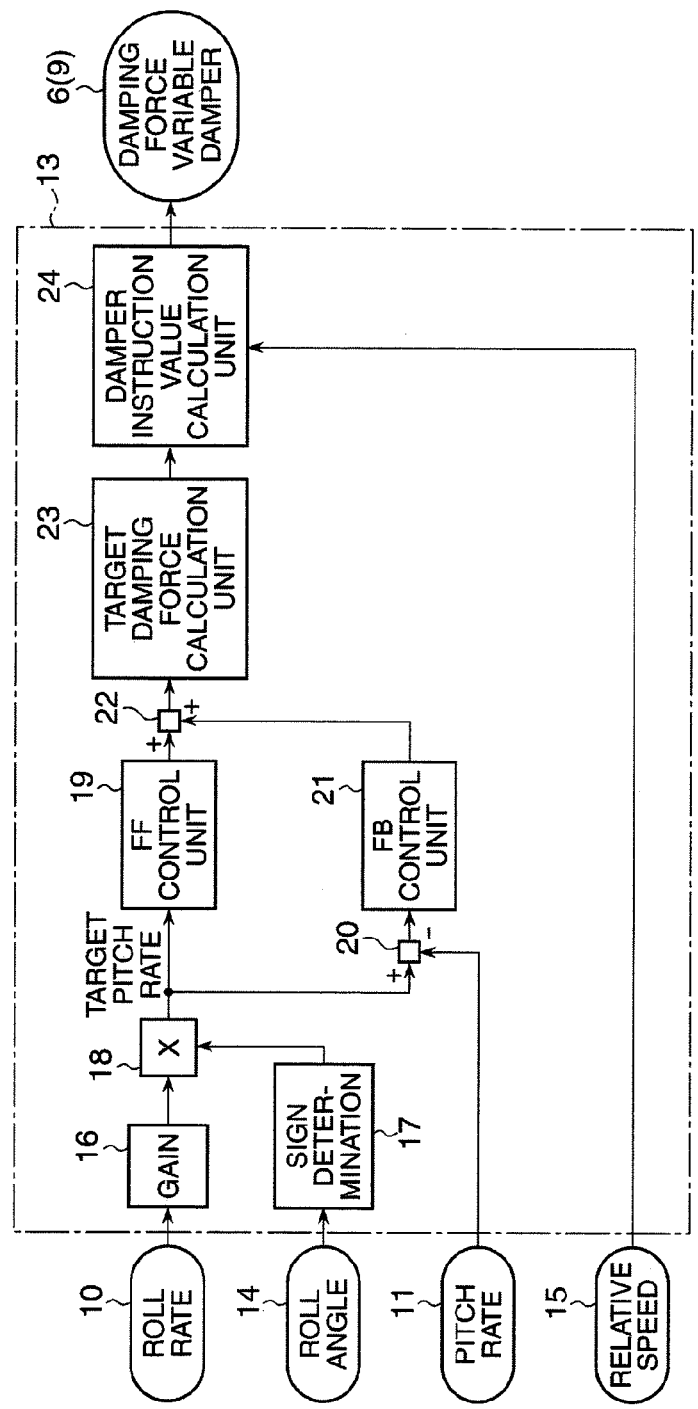
FIG. 2 is a control block diagram illustrating the vehicle body attitude control apparatus according to the first embodiment.

Reference numeral 13 denotes a controller as a control unit constituted by, for example, a microcomputer. As shown in FIG. 2, the input side of the controller 13 is connected to, for example, the roll rate sensor 10, the pitch rate sensor 11, and the lateral acceleration sensor 12. The output side of the controller 13 is connected to, for example, the actuators (not shown) of the damping force variable dampers 6 and 9. A signal 14 indicating a roll angle shown in FIG. 2 is calculated from a lateral acceleration signal detected by the lateral acceleration sensor 12. Further, a signal 15 indicating a relative speed can be detected with use of a signal from a vehicle height sensor (not shown) configured to detect a height of the vehicle body 1, or can be obtained based on signals of a sprung acceleration sensor and an unsprung acceleration sensor (not shown).

As shown in FIG. 2, the controller 13 includes a gain 16, a determination unit 17, a multiplication unit 18, an FF control unit 19, a difference calculation unit 20, an FB control unit 21, an average value calculation unit 22, a target damping force calculation unit 23, and a damper instruction value calculation unit 24.

Figure 3:
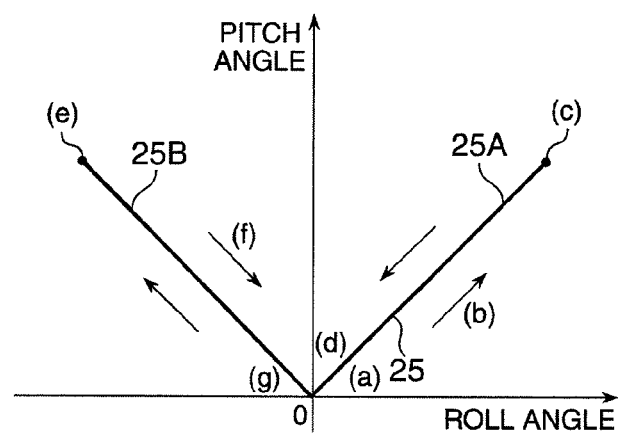
FIG. 3 illustrates a characteristic line indicating the relationship between a roll angle and a pitch angle of the vehicle to which the present invention is applied.
Figure 4:
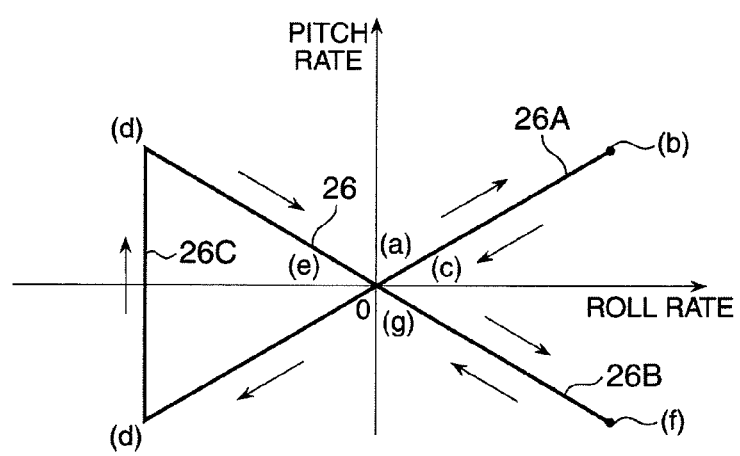
FIG. 4 illustrates a characteristic line indicating the relationship between a roll rate and a pitch rate of the vehicle to which the present invention is applied.

A characteristic line 25 shown in FIG. 3 represents an ideal relationship (characteristic) between a roll angle and a pitch angle as a proportional characteristic. A characteristic line segment 25A corresponds to positive values of roll angle, and a characteristic line segment 25B corresponds to negative values of roll angle. A characteristic line 26 shown in FIG. 4 represents an ideal relationship (characteristic) between a roll rate and a pitch rate when the vehicle makes a lane change, as a proportional characteristic. The characteristic line 26 includes characteristic line segments 26A and 26B intersecting at the 0 position, and a characteristic line segment 26C extending in parallel with the vertical axis so as to connect the ends of the characteristic line segments 26A and 26B.

The relationship between the characteristic line 25 shown in FIG. 3 and the characteristic line 26 shown in FIG. 4 is expressed as an interrelating characteristic including corresponding events represented by the alphabets (a), (b), (c), (d), (e), (f), and (g). For example, assuming that the starting point is the alphabet (a) which represents that the vehicle is running straight, when a driver starts a lane change by turning a steering wheel, the roll angle starts to increase as indicated by the arrow along the alphabet (b) shown in FIG. 3. At this time, since the pitch angle is also increasing, both the roll rate and the pitch rate shown in FIG. 4 have positive values (+). When the increasing speed of the roll angle reaches the peak, the roll rate and the pitch rate reaches their respective maximum values at the position indicated by the alphabet (b) shown in FIG. 4.

After that, when the roll angle and the pitch angle reaches their respective maximum values at the position indicated by the alphabet (c) shown in FIG. 3, both the roll rate and the pitch rate approach zero as indicated by the alphabet (c) shown in FIG. 4. After that, the driver starts to return the steering wheel, and then the roll rate reaches the maximum value in the negative (minus) direction at the position indicated by the alphabet (d) where the roll angle reaches approximately zero. On the other hand, at this time, the pitch rate, which shows a rotation in the opposite direction, changes along the characteristic line segment 26C shown in FIG. 4. Further, when the relationship between the roll angle and the pitch angle changes as indicated by the alphabets (d), (e), (f), and (g) shown in FIG. 3, the relationship between the roll rate and the pitch rate changes as indicated by the alphabets (d), (e), (f), and (g) shown in FIG. 4. Alternatively, instead of establishing the completely proportional relationship as mentioned above, a non-linear relationship may be established between the roll angle and the pitch angle and between the roll rate and the pitch rate, under the condition that the increases and reductions of the roll angle and the pitch angle are in the relationship as shown in FIG. 3, and the increases and reductions of the roll rate and the pitch rate are in the relationship as shown in FIG. 4.

The gain 16 of the controller 13 multiplies a roll rate signal detected by the roll rate sensor 10 by a gain predetermined for each vehicle, i.e., a gain based on the characteristic line 26 shown in FIG. 4, and calculates a pitch rate corresponding to the roll rate at this time from the characteristic line 26 as a target pitch rate.

The determination unit 17 determines which sign the roll angle signal 14 has, i.e., whether the roll angle signal 14 is a positive value or a negative value based on a lateral acceleration signal detected by the lateral acceleration sensor 12. The multiplication unit 18 calculates a corrected value of the target pitch rate by multiplying the signal (target pitch rate) from the gain 16 by the determined sign so that the vehicle is set into a nosedive state (such a pitch that the front side of the vehicle is lowered than the rear side of the vehicle). The gain 16, the determination unit 17, and the multiplication unit 18 constitute a target pitch rate calculation unit which is a constituent component of the present invention.

The FF control unit 19 calculates the following equations 1 to 3 upon an input of the corrected value of the target pitch rate, and obtains a target pitch moment to be achieved by feed forward control. The difference calculation unit 20 calculates a difference between a signal of an actual pitch rate detected by the pitch rate sensor 11 and the corrected value of the target pitch rate as an error deviating from the target value. The FB control unit 21 calculates a target pitch moment to be achieved by the feedback control according to the signal (error deviating from the target value) from the difference calculation unit 20. The FB control unit 21 is configured to output the target pitch moment according to the above-mentioned error as a PID controller.

The FF control unit 19 is a controller which sets a model of the characteristic from a pitch moment to a pitch rate as a secondary vibration model, calculates a transfer function, and utilizes the inverse of the transfer function. More specifically, the motion equation of a pitch motion can be obtained as the following equation 1. In this equation, Q represents a pitch angle, Ix represents pitch inertia, Kx represents pitch rigidity, Cx represents a pitch damping coefficient, and Mx represents a pitch moment.

$$Ix \cdot Q = -Kx \cdot Q - Cx \cdot Q + Mx \qquad \text{[EQUATION 1]}$$

The transfer equation from a pitch moment to a pitch rate is obtained from the equation 1 as the following equation 2, based on which the transfer function from a pitch rate to a pitch moment can be obtained as the following equation 3.

$$Q/Mx = S/(Ix \cdot S^2 + Cx \cdot S + Kx) \qquad \text{[EQUATION 2]}$$

$$Mx/Q = (Ix \cdot S^2 + Cx \cdot S + Kx)/S \qquad \text{[EQUATION 3]}$$

Figure 5:
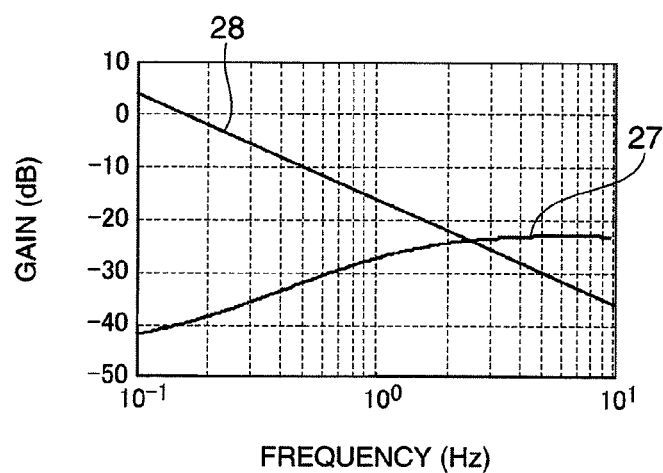
FIG. 5 illustrates characteristic lines indicating the relationship between a frequency and a gain in a transfer function for calculating a pitch moment from a target pitch rate.
Figure 6:
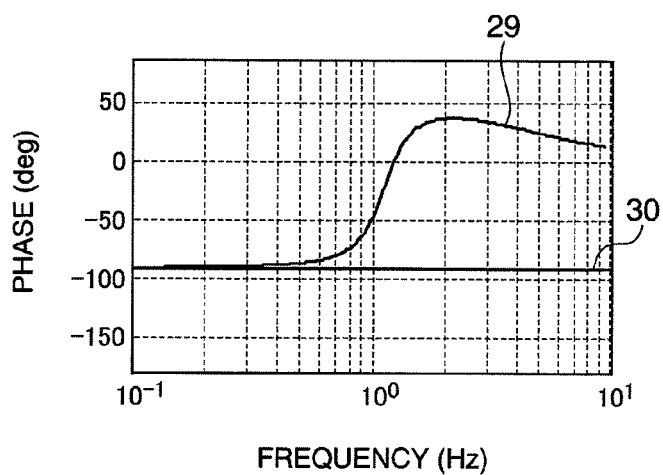
FIG. 6 illustrates characteristic lines indicating the relationship between a frequency and a phase in the transfer function for calculating a pitch moment from a target pitch rate.

FIGS. 5 and 6 are Bode diagrams illustrating this transfer function. In particular, in FIG. 5, a characteristic line 27 represents a gain characteristic curve, and a characteristic line 28 represents an integration characteristic. In FIG. 6, a characteristic line 29 represents a phase characteristic curve of the transfer function, and a characteristic line 30 represents an integration characteristic.

The average value calculation unit 22 formed in the controller 13 adds the target pitch moment calculated by the FF control unit 19 and the target pitch moment calculated by the FB control unit 21, and outputs that value as a target pitch moment Ma to the target damping force calculation unit 23 provided as a subsequent stage.

Figure 7:
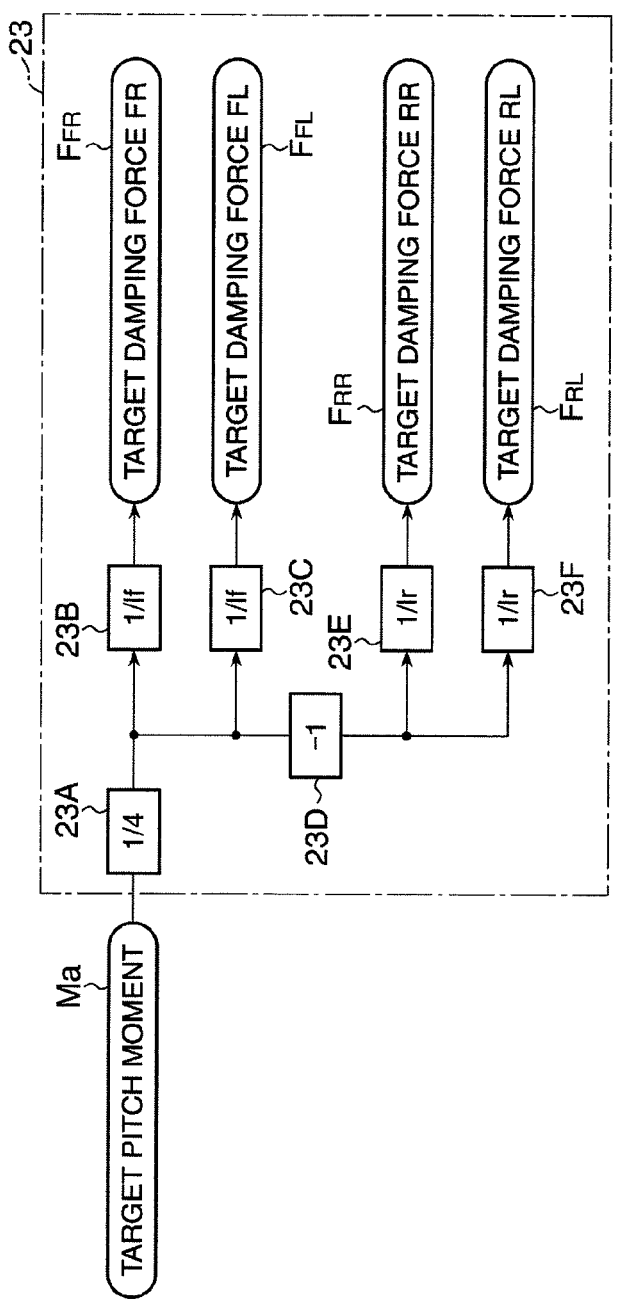
FIG. 7 is a control block diagram illustrating processing that a target damping force calculation unit shown in FIG. 2 performs to calculate target damping forces of the respective wheels from a pitch moment.

As shown in FIG. 7, upon an input of the target pitch moment Ma, the target damping force calculation unit 23 calculates the target damping forces for the respective wheels (i.e., the front left and right wheels 2, and the rear left and right wheels 3) according to the target pitch moment Ma in a distributing manner. More specifically, a block 23A of the target damping force calculation unit 23 divides the target pitch moment Ma into 4 moments to equally distribute them to the respective wheels. A next block 23B calculates a target damping force $F_{FR}$ of the front right wheel 2 by dividing the equally distributed moment (Ma/4) by a distance lf from the front right wheel 2 to the weighted center on the front wheel 2 side. A block 23C calculates a target damping force $F_{FL}$ of the front left wheel 2 by dividing the equally distributed moment (Ma/4) by the distance lf from the front left wheel 2 to the weighted center on the front wheel 2 side.

On the other hand, a block 23D of the target damping force calculation unit 23 multiplies the moment Ma/4 by "−1" so that the front wheels 2 and the rear wheels 3 have the target damping forces in the opposite directions to each other. A next block 23E calculates a target damping force $F_{RR}$ of the rear right wheel 3 by dividing the moment (−Ma/4), i.e., the equally distributed moment (Ma/4) multiplied by −1, by a distance lr from the rear right wheel 3 to the weighted center on the rear wheel 3 side. A block 23F calculates a target damping force $F_{RL}$ of the rear left wheel 3 by dividing the moment (−Ma/4), i.e., the equally distributed moment (Ma/4) multiplied by −1, by the distance lr from the rear left wheel 3 to the weighted center on the rear wheel 3 side.

The damper instruction value calculation unit 24 applies calculation processing (more specifically, calculation based on a preset characteristic map) by dividing the target damping forces $F_{FR}, F_{FL}, F_{RR}, F_{RL}$ of the respective wheels output from the target damping force calculation unit 23 by the relative speed signal 15, and calculates damper instruction values to be output to the actuators (not shown) of the respective damping force variable dampers 6 and 9 as electric current values. Then, the damping characteristics of the damping force variable dampers 6 and 9 on the respective wheels (the front left and right wheels 2 and the rear left and right wheels 3) are variably controlled in a continuous or a stepwise manner including a plurality of steps, between the hard side and the soft side according to the electric current values (damper instruction values) supplied to the actuators.

The damping force variable dampers 6 and 9 on the respective wheels (the front left and right wheels 2 and the rear left and right wheels 3) constitute the pitch moment generation unit which is a constituent component of the present invention, together with the FF control unit 19, the FB control unit 21, the average value calculation unit 22, the target damping force calculation unit 23, and the damper instruction calculation unit 24 shown in, for example, FIG. 2.

The vehicle body attitude control apparatus according to the present embodiment is configured as mentioned above. Next, the processing that the controller 13 performs to control the attitude of the vehicle body 1 will be described.

Figure 8:
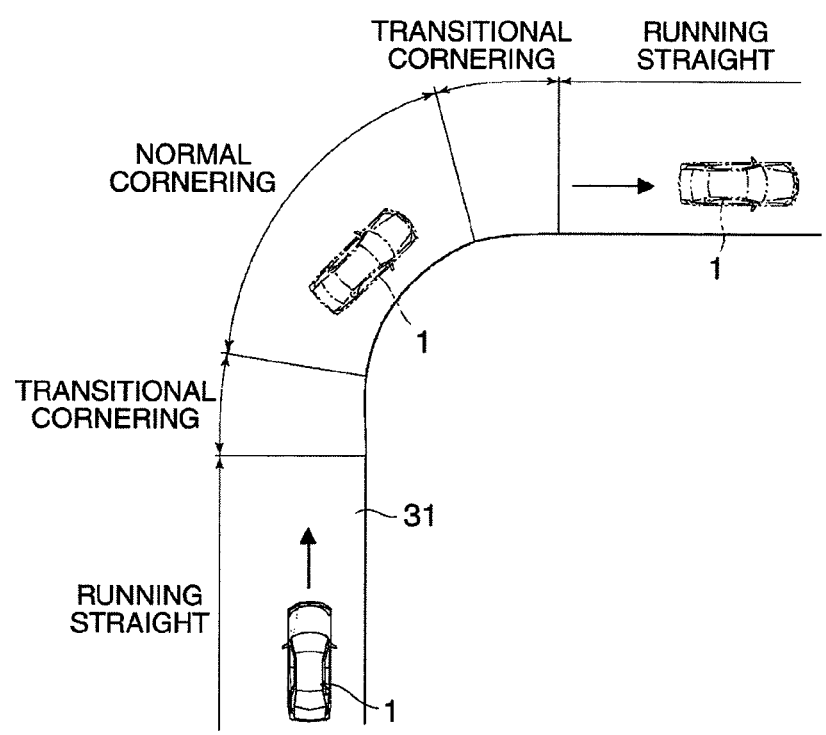
FIG. 8 is a top view schematically illustrating how a vehicle runs during cornering.

When the vehicle reaches a corner area of a road 31 and starts to corner while running, for example, as shown in FIG. 8, a driver operates the steering wheel, according to the phases, running straight, transitional cornering, normal cornering, transitional cornering, and running straight in this order. At this time, the driver of the vehicle operates the steering wheel so as to switch the steering angle according to a characteristic line 32 shown in FIG. 9.

When the vehicle is running straight, the steering angle is approximately zero and is maintained in a neutral state. When the vehicle reaches the transitional cornering, the steering angle is increased by a required angle. When the vehicle starts normal cornering, the steering angle is maintained at a substantially constant angle so as to keep the required angle. After that, when the vehicle reaches the transitional cornering, the driver operates the steering wheel to return the steering angle to the neutral state. When the vehicle returns to running straight, the steering angle is approximately zero and is maintained in the neutral state.

Figure 9:
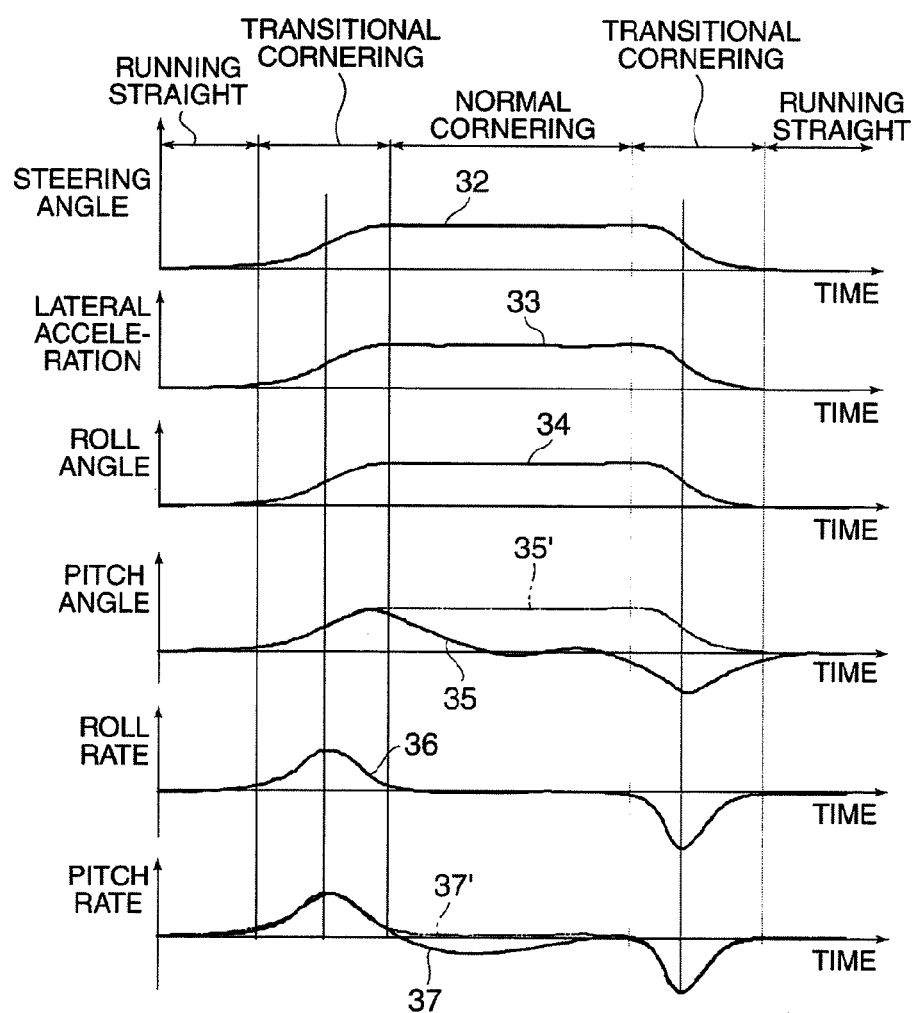
FIG. 9 illustrates characteristic lines indicating the relationship among a steering angle, lateral acceleration, a roll angle, a pitch angle, a roll rate, and a pitch rate while the vehicle is cornering.
Figure 10:
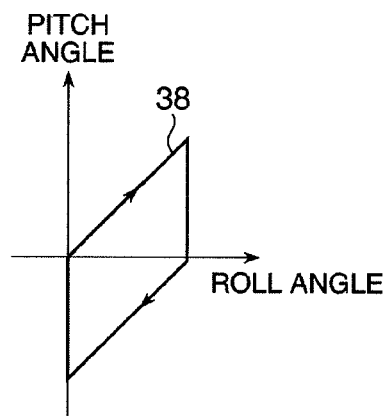
FIG. 10 illustrates a characteristic line indicating the relationship between the roll angle and the pitch angle shown in FIG. 9.

As indicated by a characteristic line 33 shown in FIG. 9, the lateral acceleration generated at the vehicle body 1 is changed according to the change in the characteristic line 32 of the steering angle, and is increased and reduced substantially proportionally thereto. As indicated by a characteristic line 34 shown in FIG. 9, the roll angle of the vehicle body 1 is also changed according to the changes in the characteristic line 32 of the steering angle and the characteristic line 33 of the lateral acceleration, and increased and reduced substantially proportionally thereto.

Characteristic lines 35, 36, and 37 in FIG. 9 indicate the characteristic lines of the pitch angle, the roll rate, and the pith rate of the vehicle body 1, respectively. The characteristic line 36 of the roll rate among them is indicated as the characteristic defined by differentiating the characteristic line 34 of the roll angle. Further, characteristic lines 35' and 37' indicated by chain double-dashed lines in FIG. 9 indicates characteristic lines of the pitch angle and the pitch rate in a comparative example (for example, the related technique discussed in Japanese Patent Application Public Disclosure No. 2007-170590).

In the present embodiment, relative to the characteristic line 34 of the roll angle shown in FIG. 9, the characteristic line 35 of the pitch angle is controlled, for example, so as to be reduced during normal cornering, and to have a negative value during the transitional cornering after that. In other words, the relationship between the roll angle and the pitch angle is set as a proportional relationship having the hysteresis characteristic as indicated by a characteristic line 38 shown in FIG. 10.

Figure 11:
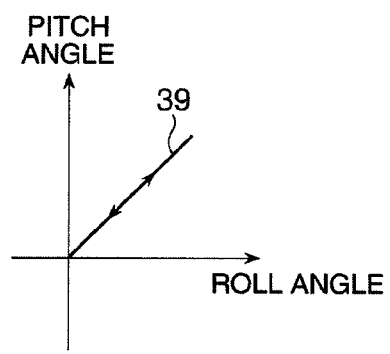
FIG. 11 illustrates a characteristic line indicating the relationship between a roll angle and a pitch angle in a comparative example.

On the other hand, the comparative example is configured to increase the pitch angle according to the roll angle as indicated by a characteristic line 39 shown in FIG. 11. Therefore, the characteristic line 35' of the pitch angle of the comparative example should generate a pitch angle of a degree according to the roll angle even during normal cornering as indicate by the chain double-dashed line in FIG. 9, which may cause a driver to have an uncomfortable ride on the vehicle.

Therefore, the first embodiment of the present invention is configured to obtain a target pitch rate proportional to a roll rate, for example, as indicated by the characteristic line 26 in FIG. 4, and variably control the damping force characteristics of the damping force variable dampers 6 and 9 disposed at the respective wheels (the front left and right wheels 2 and the rear left and right wheels 3) to achieve the target pitch rate, thereby generating a pitch moment to the vehicle body accordingly.

In this way, adjusting the pitch rate and the roll rate while the vehicle is cornering so as to establish a proportional relationship therebetween can prevent the rotational axis of the vehicle body 1 from wobbling to thereby improve a steering feeling. Further, the first embodiment calculates a target pitch rate according to a roll rate, and controls the dampers so as to generate a pitch moment to the vehicle body to achieve the target pitch rate. Therefore, the roll rate and the pitch rate are set in a proportional relationship, and the vehicle is constantly maintained in a head-down pitching state by reversing the target pitch rate by reversing the sign of the roll rate, as a result of which the rotational axis of the vehicle body 1 is stabilized and the roll feeling can be improved.

Figure 12:
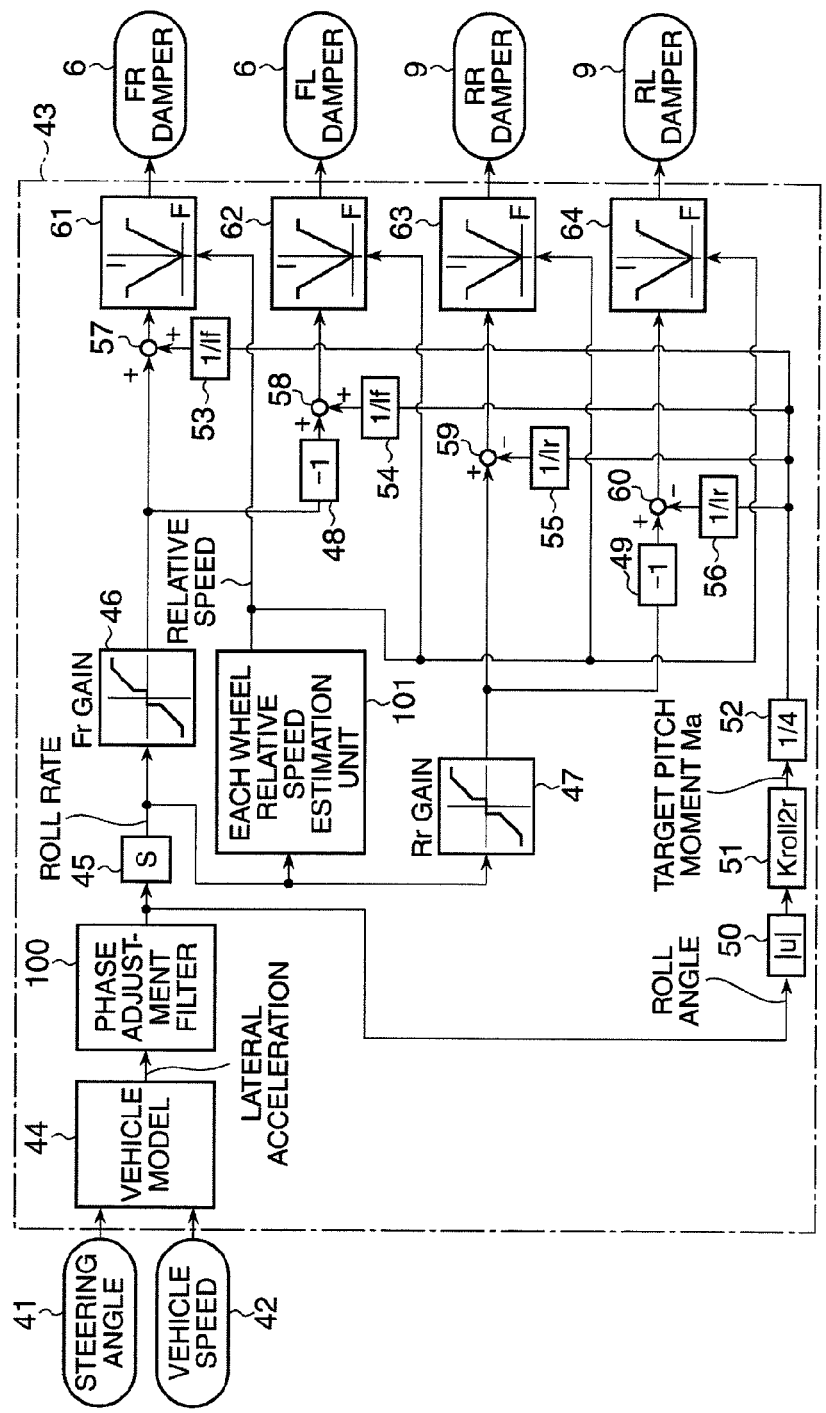
FIG. 12 is a control block diagram illustrating the vehicle body attitude control apparatus according to the second embodiment.

Next, FIGS. 1 and 12 show a second embodiment of the present invention. The second embodiment is characterized in that the second embodiment is configured to calculate a target pitch moment from a steering angle and a vehicle speed with use of a vehicle model, and control the attitude of the vehicle body without use of a roll rate sensor and a pitch rate sensor. Further, the second embodiment has been contrived in consideration of not only generation of pitching for stabilization of the rotational axis but also prevention of a roll behavior. In the following description of the second embodiment, like components are denoted by like reference numerals as those in the above-described first embodiment, and will not be repeatedly described.

In the drawings, reference numeral 41 denotes a steering angle sensor disposed at the vehicle body 1. The steering angle sensor 41 detects a steering angle (corresponding to a front wheel steering angle $\delta_f$ which will be described later) when a driver of the vehicle operates the steering wheel during, for example, cornering, and outputs the detected signal to a controller 43 which will be described later.

Reference numeral 42 denotes a vehicle speed sensor disposed at the vehicle body 1. The vehicle speed sensor 42 detects, for example, a running speed of the vehicle (corresponding to a vehicle speed V which will be described later), and outputs the detected signal to the controller 43 which will be described later.

Reference numeral 43 denotes a controller as a control unit constituted by, for example, a microcomputer. The input side of the controller 43 is connected to, for example, the steering angle sensor 41 and the vehicle speed sensor 42. The output side of the controller 43 is connected to, for example, actuators (not shown) of an FR damper (the damping force variable damper 6 of the front right wheel), an FL damper (the damping force variable damper 6 of the front left wheel), an RR damper (the damping force variable damper 9 of the rear right wheel), and an RL damper (the damping force variable damper 9 of the rear right wheel).

As shown in FIG. 12, the controller 43 includes a vehicle model unit 44, a differentiation unit 45, target damping force calculation units 46 and 47 for roll control, sign inversion units 48 and 49, an absolute value calculation unit 50, a target pitch moment calculation unit 51, an equal distribution calculation unit 52, target damping force calculation units 53, 54, 55, and 56 for the respective wheels, addition units 57 and 58, subtraction units 59 and 60, damper instruction value calculation units 61, 62, 63, and 64 for the respective wheels, a phase adjustment filter 100, and a relative speed estimation unit 101.

In the present embodiment, in the controller 43, the vehicle model unit 44 calculates lateral acceleration by estimating the lateral acceleration based on a steering angle signal detected by the steering angle sensor 41 and a vehicle speed signal detected by the vehicle speed sensor 42 according to the method that will be described below. Then, the controller 43 calculates a target pitch moment by performing the feed forward control (FF control) based on the estimated lateral acceleration, thereby achieving improvement of a roll feeling.

First, the vehicle model unit 44 estimates lateral acceleration ay from a steering angle (the front wheel steering angle $\delta_f$) and a vehicle speed V with use of the vehicle model expressed as the following equation (4). The lateral acceleration ay can be obtained from the equation 4, assuming a linear model of the vehicle without the dynamic characteristic reflected therein. In the equation 4, V represents a vehicle speed (m/s), A represents a stability factor ($S^2/m^2$), $\delta_f$ represents a front wheel steering angle (rad), and L represents a wheel base (m).

$$Ay=\{1/(1+AV^2)\}\times(V^2/L)\times\delta f \qquad \text{[EQUATION 4]}$$

Then, the dynamics from an input of a steering angle to generation of lateral acceleration and a roll angle is compensated for with use of the phase adjustment filter 100. Next, the differentiation unit 45 differentiates the lateral acceleration to calculate a lateral jerk. Since a lateral jerk substantially coincides with a roll rate, the next stage, the target damping force calculation units 46 and 47 respectively multiplies the lateral jerk correlated with the roll rate by an Fr gain for the front right wheel and an Rr gain for the rear right wheel, and output the calculated values as target damping forces for roll prevention of the front right and rear right wheels. The sing inversion units 48 and 49 multiplies the target damping forces for roll prevention by "−1" so that the target damping forces for the front left wheel and the rear left wheel have a reversed sign of the right-side wheels.

The relative speed estimation unit 101 estimates the relative speeds of the respective wheels with use of the lateral jerk calculated by the differentiation unit 45. The absolute value calculation unit 50 calculates an absolute value |u| of the lateral jerk. The target pitch moment calculation unit 51 calculates a target pitch moment Ma by multiplying the absolute value |u| of the lateral jerk by a gain "Kroll2r". It should be noted that the target pitch moment Ma is calculated proportionally to the lateral acceleration, because the transfer function from a pitch rate to a pitch moment employed in the first embodiment can be set so as to be proportional to a roll angle obtained by integrating a roll rate since the phase characteristic of the transfer function is −90 degrees under a steering input frequency of 1 Hz or lower which is a target range of this processing, and the target pitch moment Ma can be proportional to the lateral acceleration since the roll angle is correlated with the lateral acceleration.

Next, upon an input of the target pitch moment Ma, the equal distribution calculation unit 52 divides the target pitch moment Ma into 4 moments and equally distribute them to the respective wheels so as to provide target damping forces to the respective wheels (i.e., the front left and right wheels 2, and the rear left and right wheels 2) accordingly. The next units, the target damping force calculation units 53 and 54 calculate the target damping forces for the front right wheel 2 and the front left wheel 2 which will correspond to pitch generation, by dividing the equally distributed moment (Ma/4) by the distance if to the weighted center on the front wheel 2 side. Further, the target damping force calculation units 55 and 56 calculate the target damping forces for the rear right wheel 3 and the rear left wheel 3 by dividing the equally distributed moment (Ma/4) by the distance lr to the weighted center on the rear wheel 3 side.

Next, the addition units 57 and 58 add the target damping forces for roll prevention, which are output from the target damping force calculation unit 46, and the target damping forces for pitch generation, which are output from the target damping force calculation units 53 and 54, to calculate the total damping forces as the target damping force for the front right wheel and the target damping force for the front left wheel 2. Further, since the front wheels 2 and the rear wheels 3 should have oppositely signed pitch components, the subtraction units 59 and 60 subtract the target damping forces for pitch generation, which are output from the target damping force calculation units 55 and 56, from the target damping forces for roll prevention, which are output from the target damping force calculation unit 47, to calculate the resulting target damping forces as the target damping force for the rear right wheel 3 and the target damping force for the rear left wheel 3.

After the target damping forces for the respective wheels are calculated by applying addition and subtraction between the target damping forces calculated for roll prevention and the target damping forces calculated for pith generation in this way, the damper instruction value calculation units 61, 62, 63, and 64 output required electric current values from a pre-stored damper characteristic map based on these target damping forces and the relative speeds estimated at the relative speed estimation unit 101. More specifically, the damper instruction values calculation units 61, 62, 63, and 64 calculates, as electric current values, damper instruction values to be output to the actuators (not shown) of the FR damper (the damping force variable damper 6 of the front right wheel), the FL damper (the damping force variable damper 6 of the front left wheel), the RR damper (the damping force variable damper 9 of the rear right wheel), and the RL damper (the damping force variable damper 9 of the rear right wheel).

Then, the damping force variable dampers 6 and 9 of the respective wheels (the front left and right wheels 2 and the rear left and right wheels 3) are variably controlled so that the damping force characteristics thereof vary continuously or stepwise manner including a plurality of steps between the hard side and the soft side according to the electric current values (the damper instruction values) supplied to the actuators. The damping force variable dampers 6 and 9 of the respective wheels (the front left and right wheels 2 and the rear left and right wheels 3) constitute the pitch moment generation mechanism of the pitch moment generation unit which is a constituent element of the present invention. Further, the absolute value calculation unit 50 and the target pitch moment calculation unit 51 of the controller 43 shown in FIG. 12 constitute the target pitch rate calculation unit and the target pitch moment calculation unit, respectively.

As such, the second embodiment configured in this way can also establish an ideal relationship between a pitch behavior and a roll behavior, thereby improving a feeling that a driver has during driving. Especially, the second embodiment can carry out the attitude control of the vehicle body 1 based on only a steering angle and a vehicle speed without use of a roll rate sensor and a pitch rate sensor.

As a result, it is possible to reduce the number of required sensors, leading to a reduction in the cost and simplification of the system. Further, it is possible to control the attitude of the vehicle body in consideration of not only generation of pitching for stabilization of the rotational axis but also prevention of a roll behavior, thereby achieving improvement of a roll feeling.

Figure 13:
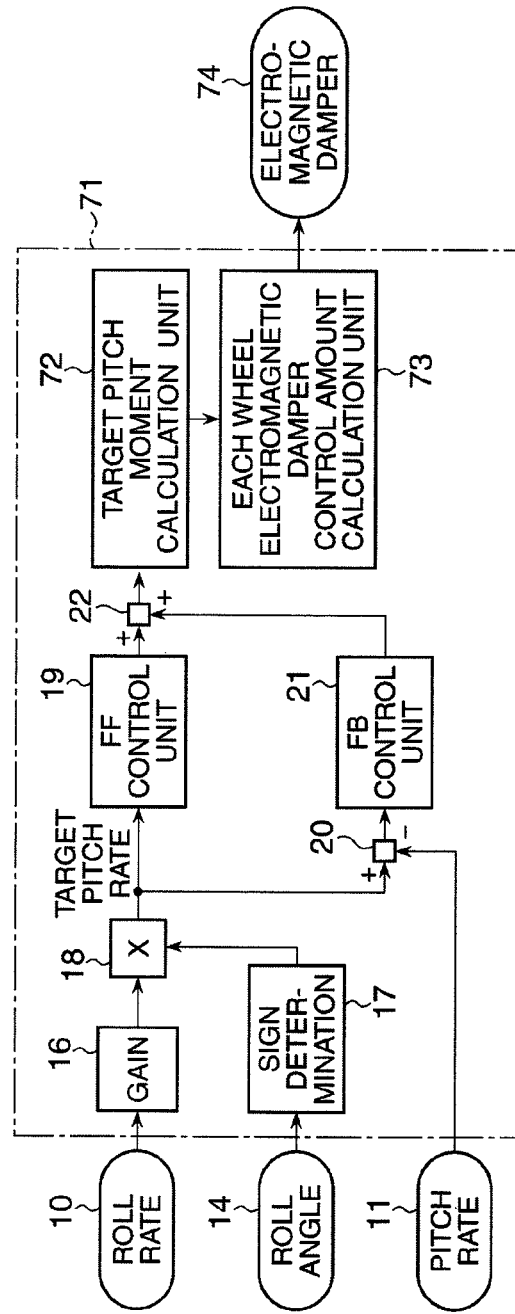
FIG. 13 is a control block diagram illustrating a vehicle body attitude control apparatus according to the third embodiment.

Next, FIG. 13 illustrates a third embodiment of the present invention. The third embodiment is characterized in that the actuator for controlling the attitude of the vehicle body is embodied by an active suspension capable of generating a thrust force by itself, instead of a semi-active actuator. In the following description of the third embodiment, like components are denoted by like reference numerals as those in the above-described first embodiment, and will not be repeatedly described.

Referring to FIG. 13, reference numeral 71 denotes a controller as a control unit that the present embodiment employs. The controller 71 is configured in an approximately same manner as the controller 13 of the first embodiment. The input side of the controller 71 is connected to, for example, the roll rate sensor 10, the pitch rate sensor 11, and the lateral acceleration sensor 12. The roll angle signal 14 shown in FIG. 13 is calculated from a lateral acceleration signal detected by the lateral acceleration sensor 12.

However, the controller 71 in the present embodiment is different from the first embodiment in terms of its output side connected to, for example, an active suspension (an electromagnetic damper 74 which will be described later) capable of generating a thrust force by itself. Further, the controller 71 includes the gain 16, the determination unit 17, the multiplication unit 18, the FF control unit 19, the difference calculation unit 20, the FB control unit 21, the average value calculation unit 22, a target pitch moment calculation unit 72, and an each wheel electromagnetic damper control amount calculation unit 73. Among these units, the target pitch moment calculation unit 72 and the each wheel electromagnetic damper control amount calculation unit 73 are different from the units in the first embodiment.

Reference numeral 74 denotes a plurality of electromagnetic dampers (four dampers) disposed at the respective wheels of the vehicle. The electromagnetic dampers 74 are constituted by active suspensions respectively disposed at, for example, the front left and right wheels 2 and the rear left and right wheels 3, and function to generate thrust forces for vertically raising or lowering the vehicle body 1 on the respective wheels according to control signals from the each wheel electromagnetic damper control amount calculation unit 73.

After the average value calculation unit 22 adds a target pitch moment calculated by the FF control unit 19 and a target pitch moment calculated by the FB control unit 21 to obtain an average value, the target pitch moment calculation unit 72 of the controller 71 makes a calculation to distribute the target pitch moment to the respective wheels (i.e., the front left and right wheels 2 and the rear left and right wheels 3) according to the calculated average value. Then, the each wheel electromagnetic damper control amount calculation unit 73 calculates electromagnetic damper control amounts so that the electromagnetic dampers 74 at the respective wheels can generate thrust forces corresponding to the target pitch moments distributed to the respective wheels, and individually output the control signals indicating the calculated control amounts to the respective electromagnetic dampers 74.

As such, the third embodiment configured as mentioned above can also establish an ideal relationship between a pitch behavior and a roll behavior, thereby improving a feeling that a driver has during driving. Especially, the third embodiment can generate a pitch rate proportional to a roll rate by calculating target thrust forces for the respective wheels and generating thrust forces to the active suspensions according to the target values. Therefore, it is possible to stabilize the rotational axis of the vehicle body 1 and improve a roll feeling.

Figure 14:
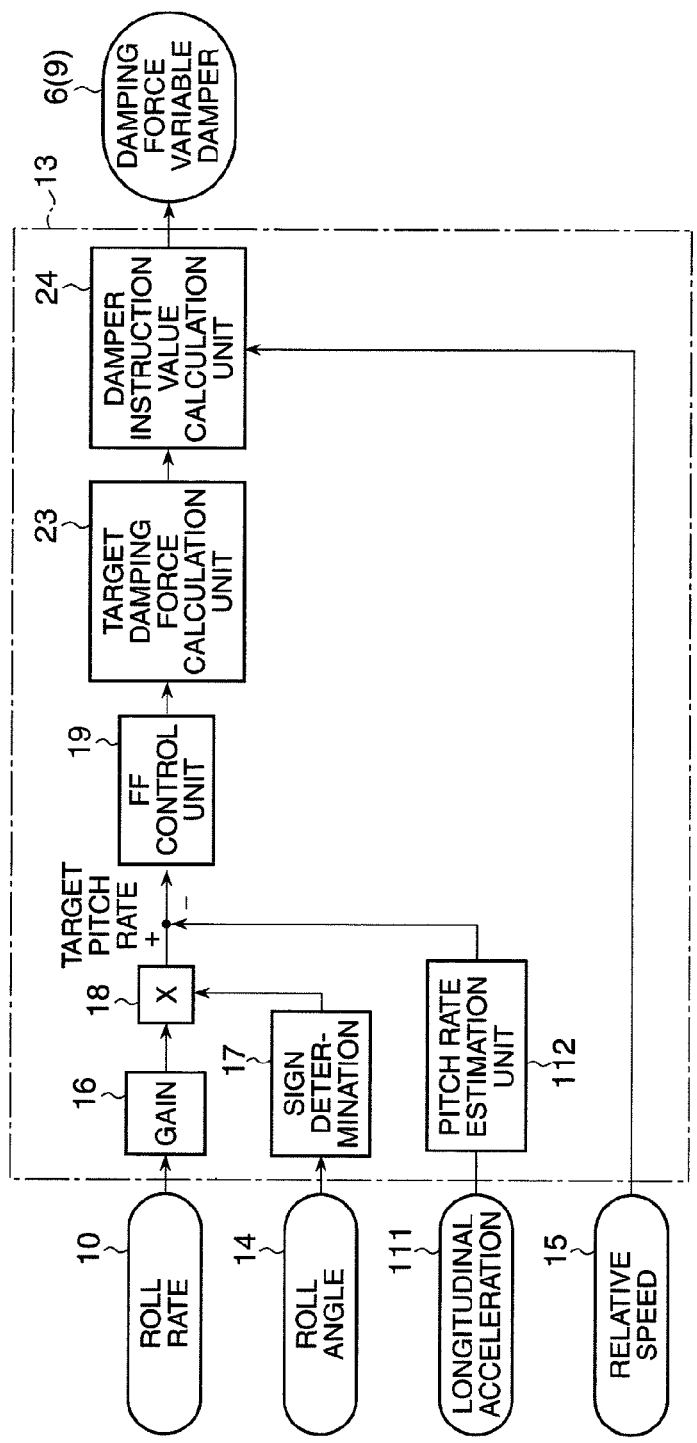
FIG. 14 is a control block diagram illustrating a vehicle body attitude control apparatus according to the fourth embodiment.

Next, FIG. 14 shows a fourth embodiment of the present invention. The fourth embodiment is characterized by applying feed forward control to a pitch rate, compared to the first embodiment which applies feedback control to a pitch rate. In the following description of the fourth embodiment, like components are denoted by like reference numerals as those in the above-described first embodiment, and will not be repeatedly described.

In FIG. 14, reference numeral 111 denotes a longitudinal acceleration detection unit (longitudinal acceleration state detection unit) for detecting longitudinal acceleration. The longitudinal acceleration detection unit may be embodied by, for example, a longitudinal acceleration sensor, or a unit for measuring a differential value of a detection value of a vehicle speed sensor. Alternatively, the longitudinal acceleration detection unit may be embodied by a unit for estimating longitudinal acceleration based on, for example, an operation amount of a brake pedal by a driver or a pressure in a wheel cylinder of a brake apparatus.

Reference numeral 112 denotes a pitch rate estimation unit (pitch state estimation unit) for estimating a generated pitch rate. The pitch rate estimation unit 112 estimates a generated pitch rate based on the detection result of the above-mentioned longitudinal acceleration detection unit.

Then, the pitch rate generated due to the longitudinal acceleration is subtracted from a target pitch rate output from the multiplication unit 18, and the difference from the target pitch rate is output to the FF control unit 19 so as to adjust dumping forces of the dumping force variable dampers 6 (9) through a target damping force calculation unit 23 and a damper instruction value calculation unit 24, thereby obtaining the target pitch rate.

As a result, effects similar to the first embodiment can be obtained by the fourth embodiment. Moreover, pitch generated by a braking operation or the like is taken into account in the feed forward control unit, and an excess over or shortage from the pitch rate is controlled by the damping force variable dampers. This can reduce the control amount for pitch relying upon the damping force variable dampers, whereby the control amount for roll can be increased accordingly.

It should be noted that, while a longitudinal acceleration detection unit is used as the longitudinal acceleration state detection unit in the above-described embodiment, the longitudinal acceleration state detection unit can be embodied by a unit for determining a longitudinal acceleration state using a change rate of longitudinal acceleration.

Further, although the above embodiment has been described assuming that a roll rate and a roll angle can be detected, a roll rate and a roll angle may be estimated based on lateral acceleration calculated from a steering angle and a vehicle speed, or a signal value output from a lateral acceleration sensor.

The first and third embodiments have been described based on an example detecting a roll rate and a pitch rate with use of respective sensors. However, the present invention is not limited thereto. For example, a roll rate and a pitch rate may be calculated with use of three or more vertical acceleration sensors disposed at the vehicle body.

Further, the relative speed for use in the first, second, and third embodiments may be obtained by differentiating a detection value of the vehicle height sensor, or may be obtained by calculating relative acceleration from detection values of, for example, the unsprung acceleration sensor and the sprung acceleration sensor, and integrating these values. Alternatively, since a movement at the unsprung side is nearly zero when the vehicle is running on a flat road surface, the relative speed may be a sprung-side speed calculated by integrating a detection value of the sprung-side acceleration sensor. Further, the second embodiment uses lateral acceleration estimated from a steering angle and a vehicle speed, but the lateral acceleration may be detected by a lateral acceleration sensor. Further, the other signals may be also obtained by any calculation method.

Further, the first embodiment has been described based on an example that multiplies a roll rate signal detected by the roll rate sensor 10 by the gain predetermined for each vehicle (for example, the gain indicated by the characteristic line 26 in FIG. 4), and calculates a pitch rate corresponding to the roll rate at that time according to the characteristic line 26 as a target pitch rate. However, the present invention is not limited thereto. For example, a non-linear characteristic defined by a curve may be set as the characteristic line 26 in FIG. 4, and a target pitch rate may be calculated so as to nonlinearly increase according to the degree of a roll rate. The forgoing also applies to the second and third embodiments.

Next, advantageous effects provided by the above-described embodiments will be described. That is, according to an embodiment of the present invention, the target pitch rate calculation unit calculates a target pitch rate proportional to a roll rate, and the pitch moment generation unit controls the dampers so as to generate a pitch moment to the vehicle body to achieve the target pitch rate. Adjusting a pitch rate and a roll rate so as to establish a proportional relationship therebetween in this way can prevent the rotational axis of the vehicle body from wobbling, thereby improving a steering feeling.

Further, according to an embodiment of the present invention, the target pitch rate calculation unit is configured to calculate a target pitch rate so that the degree of nosedive of the vehicle body is increased according to the degree of a roll rate of the vehicle body. As a result, the front wheel side is lowered, for example, when the vehicle corners, thereby realizing a roll behavior accompanied by head-down pitching to improve a feeling that a driver has during cornering.

According to an embodiment of the present invention, the pitch moment generation unit includes the target pitch moment calculation unit (for example, a quadric model and a differentiator) for calculating a target pitch moment from a target pitch rate with use of the vehicle model, and the pitch moment generation mechanism (for example, a semi-active suspension or an active suspension) for generating a pitch moment so that the pitch moment of the vehicle body reaches the target pitch moment.

As a result, it is possible to obtain lateral acceleration when the vehicle corners with use of only the steering angle sensor and the vehicle speed sensor without use of, for example, a roll rate sensor and a pitch rate sensor, thereby realizing a reduction in the number of required sensors, a reduction in the cost, and simplification of the system. Further, it is possible to control the attitude of the vehicle body in consideration of not only generation of pitching for stabilization of the rotational axis but also prevention of a roll behavior, thereby achieving improvement of a roll feeling.

Further, according to an embodiment of the present invention, the system includes the pitch rate detection unit for detecting a pitch rate of the vehicle body, and the pitch moment generation unit for generating a pith moment to the vehicle body so as to reduce the difference between the detected pitch rate and the target pitch rate. As a result, it is possible to generate a pitch moment to the vehicle body with use of the pitch moment generation unit so as to reduce the difference between the actual pitch rate of the vehicle body detected by the pitch rate detection unit and the target pitch rate.

Further, according to an embodiment of the present invention, the vehicle includes at least four wheels, and the pitch moment generation unit includes damping force adjustable shock absorbers disposed at the respective wheels and capable of adjusting the damping characteristics. Therefore, the pitch moment generation unit is configured to adjust a pitch moment to the vehicle body by adjusting the damping characteristics.

Further, according to an embodiment of the present invention, the vehicle includes at least four wheels. The pitch moment generation unit includes active suspensions disposed at the respective wheels for applying vertical thrust forces to the vehicle body and the wheels, and is configured to add a pitch moment to the vehicle body by adjusting the vertical forces. As a result, calculating target thrust forces of the respective wheels and generating thrust forces at the active suspensions according to the target values enable generation of a pitch rate proportional to the roll rate, thereby stabilizing the rotational axis of the vehicle body and improving a roll feeling.

Further, according town embodiment of the present invention, the front side of the vehicle body is lowered and a pitch angle is generated, which acts to reduce the roll rate. The reason is as follows. When no pitch angle is generated, the roll rate is a differential value of a pure roll angle (an angle relative to the axis of the horizontal traveling direction). On the other hand, when a pitch angle is generated, the roll rate is a value resulting from subtraction of an angle speed generated from an inclination of a yaw angle (an angle speed in the vertical direction) from a differential value of a roll angle, whereby the pitch angle and the roll rate are in a compensating relationship, thereby reducing the roll rate according to the generation of the pitch angle. Approximately, a roll rate can be calculated by the following equation:

(roll rate)=(differential value of roll angle)−(yaw angle speed)×(pitch angle).

The above-described embodiments make calculations with use of various values such as a roll angle, a roll rate, and a pitch rate. However, the controller does not have to obtain those values during the calculations, and may use an approximated value or an estimated value. Further, for example, in determination of the sign of a roll angle, the controller may use another value having just a sing varying in a same manner as the roll angle. Further, a map may be used instead of calculating it.

The above-described embodiments control rolling, but in practical use of the present invention, the roll control may be used in combination with bouncing control such as skyhook control. In this case, for example, the control may be performed by averaging a target damping force from the bouncing control and a target damping force from the present invention. Alternatively, the priority may be determined based on a steering angle; more specifically, the target damping force from the bouncing control may be prioritized when the steering angle is small, while the control of the present invention may be prioritized when the steering angle is large.

Further, in the above-described embodiments, the roll state detection unit detects a roll rate, but this does not limit the present invention. The roll state detection unit may detect a roll angle or a change rate of a roll angular velocity. Also, the above-described embodiments use a pitch rate as a pitch state or a target pitch state, but this does not limit the present invention. Instead, a pitch angle or a change rate of a pitch rate may be used as a pitch state and a target pitch state.

As mentioned above, according to the embodiments of the present invention, it becomes possible to establish an ideal coupling relationship between a pitch behavior and a roll behavior, thereby improving a feeling that a driver has during driving.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2010-170247 filed on Jul. 29, 2010. The entire disclosure of Japanese Patent Applications No. 2010-170247 filed on Jul. 29, 2010, including specification, claims, drawings and summary is incorporated herein by reference in its entirety.

The entire disclosure of Japanese Patent Application Public Disclosure Nos. 2007-290650 and 2007-170590, including specification, claims, drawings and summary is incorporated herein by reference in its entirety.

What is claimed is:

1. A vehicle body attitude control apparatus for controlling an attitude of a vehicle body of a vehicle, the apparatus comprising:
    a target pitch rate calculation unit configured to calculate a target pitch rate as a target value of a pitch rate of the vehicle body by multiplying a detected roll rate signal by a predetermined gain so that the target pitch rate increases according to a roll rate of the vehicle body; and
    a pitch moment generation unit configured to generate a pitch moment to be applied to the vehicle body so that the pitch state of the vehicle body approaches the target pitch rate.

2. The vehicle body attitude control apparatus according to claim 1, wherein
    the target pitch rate calculation unit calculates the target pitch rate so that a nosedive inclination of the vehicle body is increased according to the degree of the roll rate of the vehicle body.

3. The vehicle body attitude control apparatus according to claim 1, wherein the pitch moment generation unit includes
    a target pitch moment calculation unit configured to calculate a target pitch moment from the target pitch rate with use of a vehicle model, and
    a pitch moment generation mechanism configured to generate a pitch moment so that the pitch moment of the vehicle body approaches the target pitch moment.

4. The vehicle body attitude control apparatus according to claim 2, wherein the pitch moment generation unit includes a target pitch moment calculation unit configured to calculate a target pitch moment from the target pitch rate with use of a vehicle model, and a pitch moment generation mechanism configured to generate a pitch moment so that the pitch moment of the vehicle body approaches the target pitch moment.

5. The vehicle body attitude control apparatus according to claim 1, further comprising a pitch rate detection unit configured to detect the pitch rate of the vehicle body,
    wherein the pitch moment generation unit generates a pitch moment to be applied to the vehicle body so as to reduce a difference between the detected pitch rate and the target pitch rate.

6. The vehicle body attitude control apparatus according to claim 2, further comprising a pitch rate detection unit configured to detect the pitch rate of the vehicle body,
    wherein the pitch moment generation unit generates a pitch moment to be applied to the vehicle body so as to reduce a difference between the detected pitch rate and the target pitch rate.

7. The vehicle body attitude control apparatus according to claim 1, wherein the vehicle includes at least four wheels,
    wherein the pitch moment generation unit includes a damping force adjustable shock absorber capable of adjusting a damping characteristic thereof, the shock absorber being disposed at each of the wheels, and
    wherein the pitch moment generation units adjust the pitch moment to be applied to the vehicle body by adjusting the damping force characteristic.

8. The vehicle body attitude control apparatus according to claim 2, wherein the vehicle includes at least four wheels,
    wherein the pitch moment generation unit includes a damping force adjustable shock absorber capable of adjusting a damping characteristic thereof, the shock absorber being disposed at each of the wheels, and
    wherein the pitch moment generation units adjust the pitch moment to be applied to the vehicle body by adjusting the damping force characteristic.

9. The vehicle body attitude control apparatus according to claim 3, wherein the vehicle includes at least four wheels,
    wherein the pitch moment generation unit includes a damping force adjustable shock absorber capable of adjusting a damping characteristic thereof, the shock absorber being disposed at each of the wheels, and
    wherein the pitch moment generation units adjust the pitch moment to be applied to the vehicle body by adjusting the damping force characteristic.

10. The vehicle body attitude control apparatus according to claim 4, wherein the vehicle includes at least four wheels,
    wherein the pitch moment generation unit includes a damping force adjustable shock absorber capable of adjusting a damping characteristic thereof, the shock absorber being disposed at each of the wheels, and
    wherein the pitch moment generation units adjust the pitch moment to be applied to the vehicle body by adjusting the damping force characteristic.

11. The vehicle body attitude control apparatus according to claim 1, wherein the vehicle includes at least four wheels,
wherein the pitch moment generation unit includes an active suspension configured to apply a vertical force to the vehicle body and the wheel, the active suspension being disposed at each of the wheels, and
wherein the pitch moment generation unit applies the pitch moment to the vehicle body by adjusting the vertical force.

12. The vehicle body attitude control apparatus according to claim 2, wherein the vehicle includes at least four wheels,
wherein the pitch moment generation unit includes an active suspension configured to apply a vertical force to the vehicle body and the wheel, the active suspension being disposed at each of the wheels, and
wherein the pitch moment generation unit applies the pitch moment to the vehicle body by adjusting the vertical force.

13. The vehicle body attitude control apparatus according to claim 3, wherein the vehicle includes at least four wheels,
wherein the pitch moment generation unit includes an active suspension configured to apply a vertical force to the vehicle body and the wheel, the active suspension being disposed at each of the wheels, and
wherein the pitch moment generation unit applies the pitch moment to the vehicle body by adjusting the vertical force.

14. The vehicle body attitude control apparatus according to claim 4, wherein the vehicle includes at least four wheels,
wherein the pitch moment generation unit includes an active suspension configured to apply a vertical force to the vehicle body and the wheel, the active suspension being disposed at each of the wheels, and
wherein the pitch moment generation unit applies the pitch moment to the vehicle body by adjusting the vertical force.

15. The vehicle body attitude control apparatus according to claim 1, wherein the roll rate of the vehicle body and the pitch rate of the vehicle body are obtained from a steering angle and a vehicle speed.

* * * * *